(12) United States Patent
Hailston et al.

(10) Patent No.: US 8,282,111 B2
(45) Date of Patent: Oct. 9, 2012

(54) CART WITH MOVABLE PLATFORM

(75) Inventors: Bruce L. Hailston, Midland, MI (US); Andrew P. Richard, Gladwin, MI (US)

(73) Assignees: Magline, Inc., Standish, MI (US); Swift Water Logistics, Inc., Charlotte, NC (US)

( * ) Notice: Subject to any disclaimer, the term of this patent is extended or adjusted under 35 U.S.C. 154(b) by 56 days.

(21) Appl. No.: 12/581,619

(22) Filed: Oct. 19, 2009

(65) Prior Publication Data

US 2010/0096820 A1    Apr. 22, 2010

Related U.S. Application Data

(60) Provisional application No. 61/106,971, filed on Oct. 20, 2008.

(51) Int. Cl.
*B62B 3/02* (2006.01)
(52) U.S. Cl. .................................................. 280/43.12
(58) Field of Classification Search ............... 280/47.29, 280/43.12; 187/224, 233; 188/19
See application file for complete search history.

(56) References Cited

U.S. PATENT DOCUMENTS

| | | | | |
|---|---|---|---|---|
| 1,432,299 | A * | 10/1922 | Pleines | 187/233 |
| 1,497,085 | A * | 6/1924 | Brandt | 187/233 |
| 3,052,323 | A * | 9/1962 | Hopfeld | 187/232 |
| 3,433,324 | A * | 3/1969 | McIntosh | 187/222 |
| 3,982,767 | A | 9/1976 | Larsson et al. | |
| 4,114,916 | A | 9/1978 | Oyama | |
| 4,347,794 | A | 9/1982 | Nordstrom | |
| 4,735,305 | A | 4/1988 | Lutz et al. | |
| 4,844,681 | A | 7/1989 | Pierre et al. | |
| 5,251,922 | A * | 10/1993 | Mann | 280/47.29 |
| 5,374,151 | A | 12/1994 | Matthews | |
| 5,556,118 | A * | 9/1996 | Kern et al. | 280/47.16 |
| 5,575,605 | A * | 11/1996 | Fisher | 414/490 |
| 5,752,584 | A * | 5/1998 | Magoto et al. | 187/234 |
| 5,885,047 | A * | 3/1999 | Davis et al. | 414/490 |
| 6,203,029 | B1 * | 3/2001 | Ondrasik | 280/33.991 |
| 6,286,631 | B1 * | 9/2001 | Kimble | 188/19 |
| 6,286,812 | B1 | 9/2001 | Cherry | |
| 6,308,404 | B1 | 10/2001 | Hirschmann | |
| 6,530,740 | B2 * | 3/2003 | Kim | 414/490 |
| 6,537,017 | B2 | 3/2003 | Stone | |

(Continued)

FOREIGN PATENT DOCUMENTS

JP        5-294245        11/1993

(Continued)

OTHER PUBLICATIONS

Written Opinion & International Search Report for PCT/US09/61304, mailed May 27, 2010, 9 pages.

*Primary Examiner* — Jeffrey J Restifo
(74) *Attorney, Agent, or Firm* — Varnum, Riddering, Schmidt & Howlett LLP

(57) ABSTRACT

A cart may include a frame, a plurality of wheels carried by the frame, a platform movably carried by the frame, and a lift assembly. The lift assembly may be carried at least in part by the frame and operably associated with the platform to move the platform relative to the frame. The lift assembly may include at least one hydraulic actuator having a piston rod movable under hydraulic pressure to move the platform relative to the frame.

27 Claims, 10 Drawing Sheets

U.S. PATENT DOCUMENTS

| | | |
|---|---|---|
| 6,637,586 B1 | 10/2003 | Kuecker et al. |
| 7,320,385 B2 * | 1/2008 | Katae et al. .................... 187/227 |
| 7,478,704 B2 * | 1/2009 | Church .......................... 187/234 |
| 7,645,108 B2 * | 1/2010 | Benko ............................ 414/490 |
| 7,841,603 B2 * | 11/2010 | White ......................... 280/47.29 |
| 7,914,017 B2 * | 3/2011 | Setzer et al. ............... 280/47.29 |
| 2003/0070226 A1 | 4/2003 | Heimbrock |
| 2005/0081932 A1 | 4/2005 | Sari et al. |
| 2005/0110232 A1 * | 5/2005 | DiBenedetto ............... 280/47.29 |
| 2006/0231343 A1 * | 10/2006 | Vesa ............................. 187/233 |
| 2007/0210542 A1 * | 9/2007 | Hammond ................. 280/43.12 |
| 2010/0096820 A1 * | 4/2010 | Hailston et al. ............ 280/47.11 |

FOREIGN PATENT DOCUMENTS

| | | |
|---|---|---|
| JP | 2000-168569 | 6/2000 |
| JP | 2008-174340 | 7/2008 |

* cited by examiner

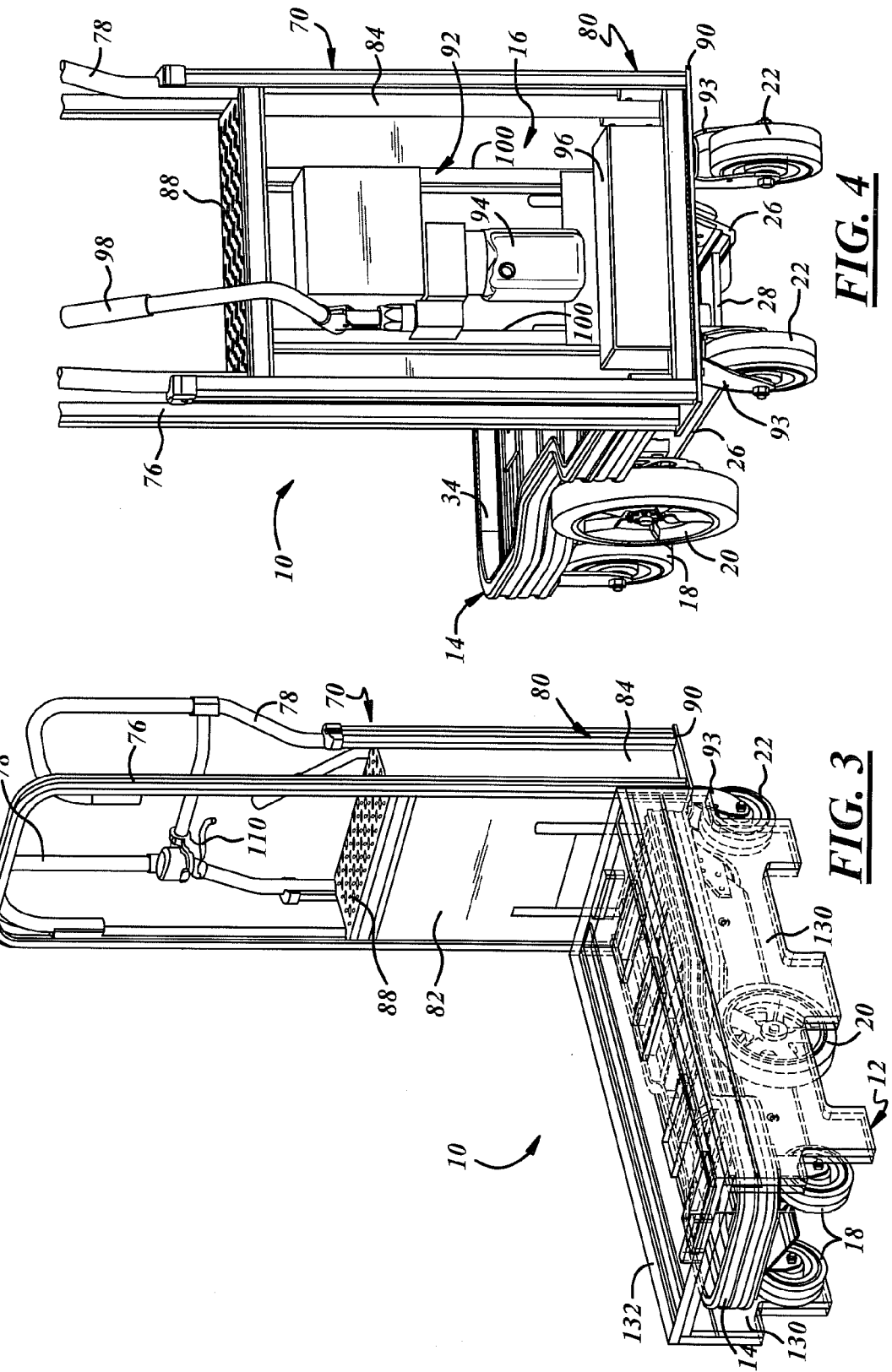

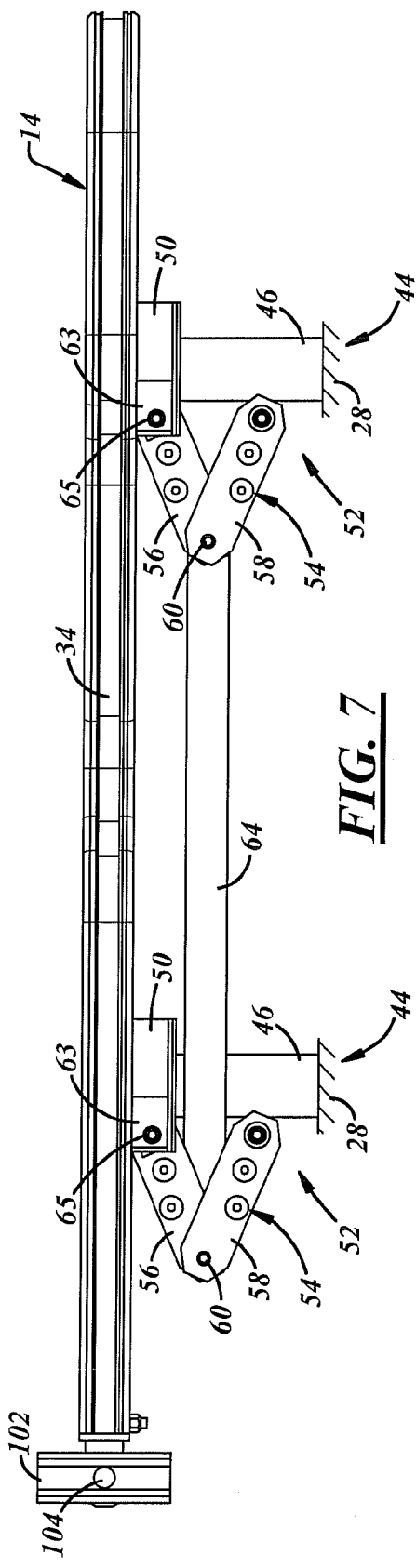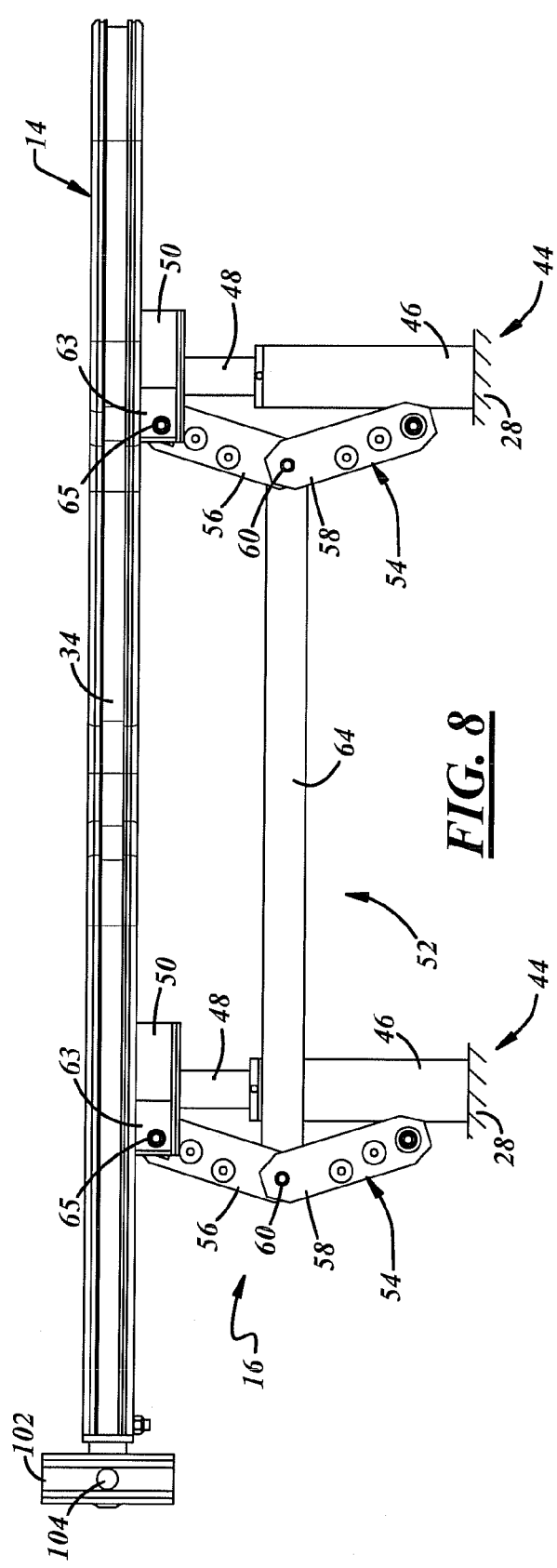

US 8,282,111 B2

CART WITH MOVABLE PLATFORM

REFERENCE TO CO-PENDING APPLICATION

This application claims the benefit of, and incorporates by reference in its entirety, U.S. Provisional Application Ser. No. 61/106,971 filed Oct. 20, 2008.

TECHNICAL FIELD

The present disclosure relates generally to a cart, and more particularly to a cart with a movable platform.

BACKGROUND

Hand trucks and carts have been used in various material handling applications. In some material handling applications it is desirable to move a plurality of goods stacked or otherwise arranged on a pallet. Accordingly, a hand truck or cart is needed to cooperate with and move a pallet loaded with product.

SUMMARY OF THE DISCLOSURE

A cart may include a frame, a plurality of wheels carried by the frame, a platform movably carried by the frame, and a lift assembly. The lift assembly may be carried at least in part by the frame and operably associated with the platform to move the platform relative to the frame. The lift assembly may include at least one hydraulic actuator having a piston rod movable under hydraulic pressure to move the platform relative to the frame.

In another implementation, a cart may include a frame, a plurality of wheels carried by the frame, a platform movably carried by the frame, a lift assembly carried at least in part by the frame and operably associated with the platform to move the platform relative to the frame, and an operator control module releasably coupled to the frame and including one or more handles and a portion of the lift assembly. The releasable control module may be used with more than one frame and platform.

BRIEF DESCRIPTION OF THE DRAWINGS

The following detailed description of preferred embodiments and best mode will be set forth with reference to the accompanying drawings, in which:

FIG. 3 is a front perspective view of the cart of FIG. 1 with an exemplary pallet shown in phantom;

FIG. 4 is an enlarged rear perspective view with a rear cover removed to show internal components;

FIG. 7 is a side view of the frame and an exemplary lifting mechanism in a first position;

FIG. 8 is a side view of the frame and lifting mechanism in a second position;

DETAILED DESCRIPTION OF PREFERRED EMBODIMENTS

Figure 2:
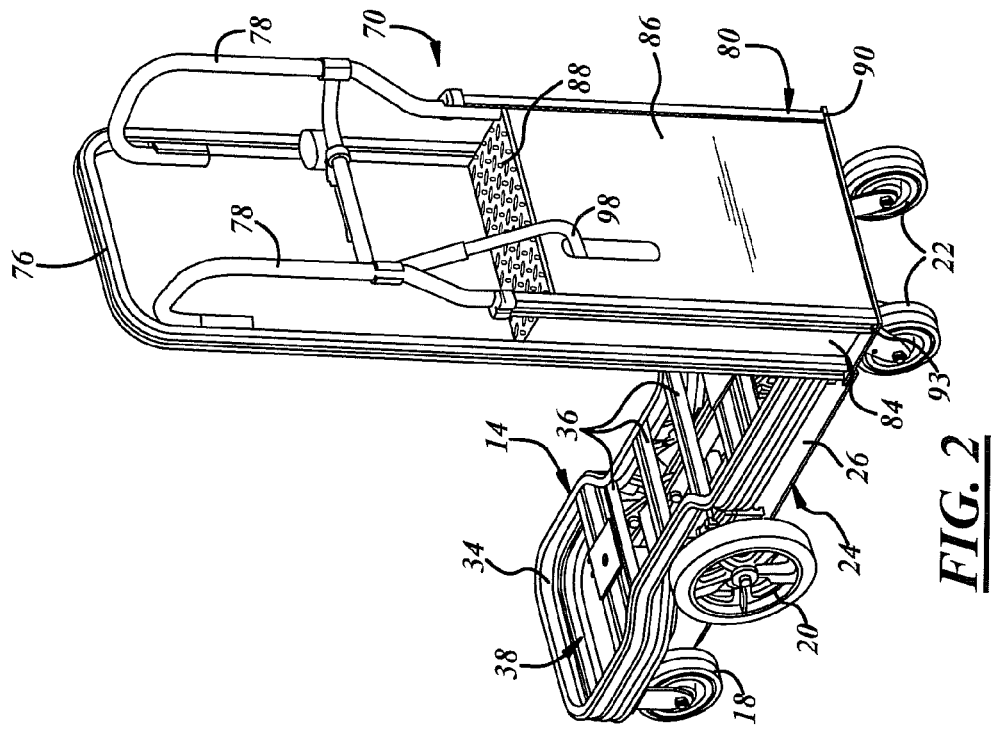
FIG. 2 is a rear perspective view of the cart of FIG. 1.
Figure 1:
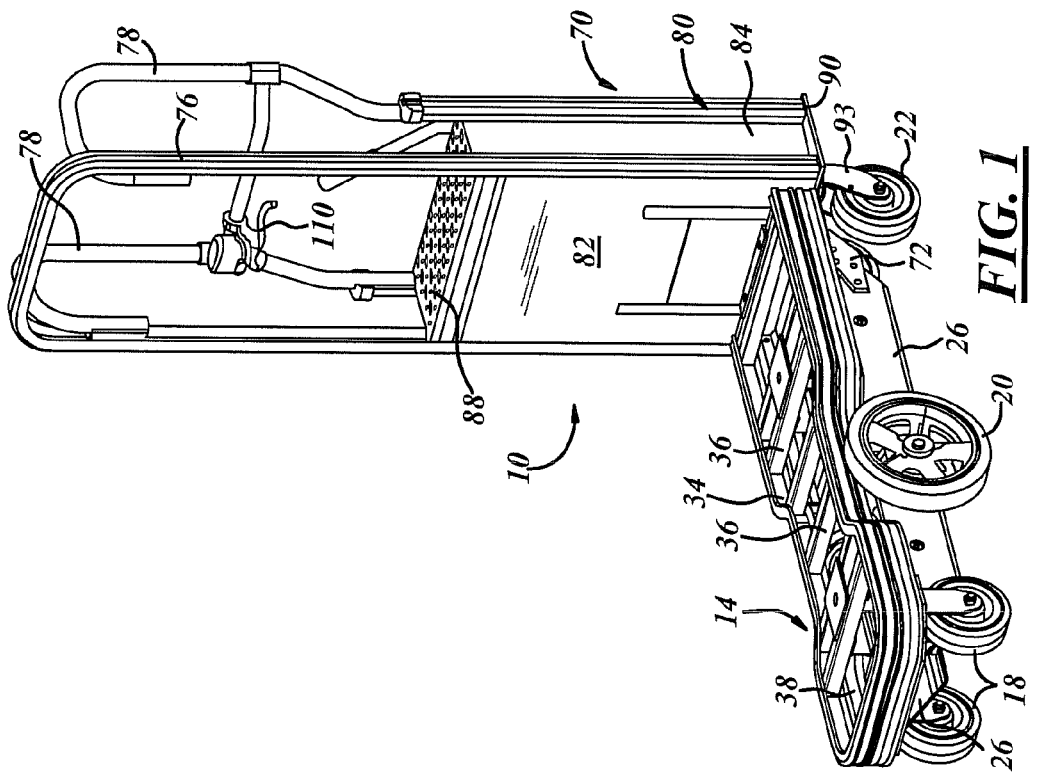
FIG. 1 is a front perspective view of one implementation of a cart with a movable platform.

Referring in more detail to the drawings, FIGS. 1-3 illustrate a cart 10 that may be used to move goods (hereinafter called "product") along a ground or floor surface. The product may be stacked on a pallet 12 (one exemplary pallet is shown in phantom in FIG. 3) or directly on a platform 14 of the cart 10. The platform 14 may be raised and lowered relative to the floor to, for example, facilitate movement of loaded pallets initially received on the floor, as will be discussed in more detail later. In one implementation, the movement of the platform 14 is powered by a hydraulic lift assembly 16 (portions of which are shown in FIGS. 4, 7, 8, 10 and 11) carried by the cart 10.

The carts 10 may include a plurality of wheels, and the cart shown has 6 wheels in front 18, middle 20 and rear 22 pairs. The rear pair 22 may swivel (e.g. be carried by a bracket that swivels) to facilitate turning the cart 10, and the front and middle pairs 18, 20 may be held inline, if desired. The front and rear pairs 18, 22 of wheels may rotate about axes that are higher off the floor than the center wheels 20 such that the cart 10 moves along on four wheels (front and middle, or rear and middle). The wheels 18, 20, 22 are carried by a frame 24 that is elevated off the floor by the wheels and coupled to the platform 14 by a portion of the lift assembly 16.

Figure 5:
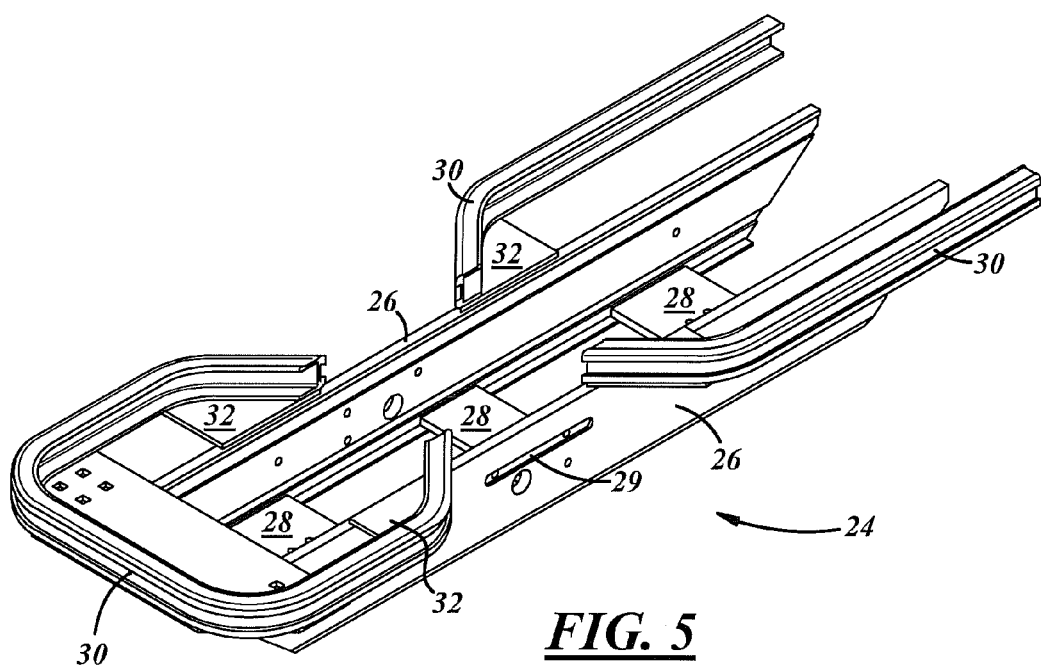
FIG. 5 is a perspective view of a frame of the cart.
Figure 6:
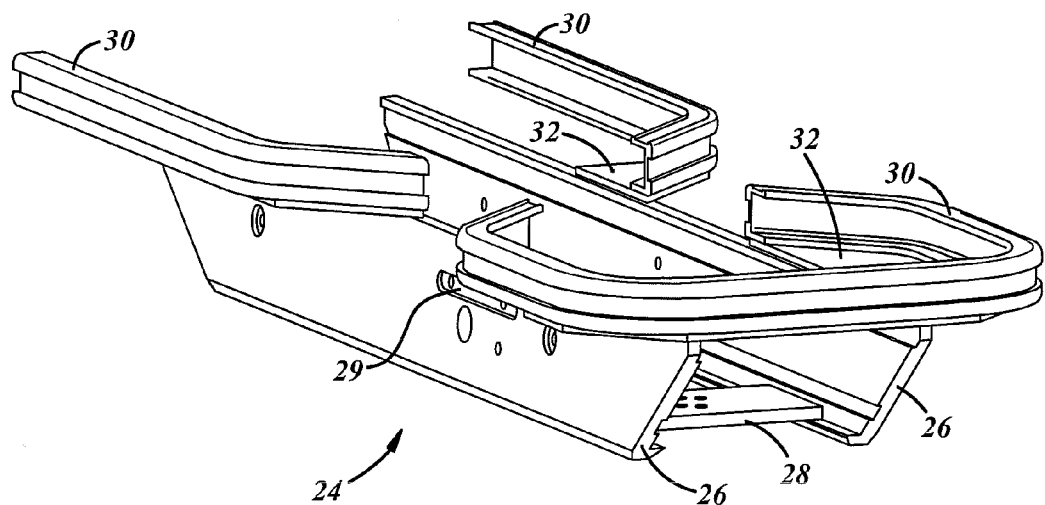
FIG. 6 is another perspective view of the frame.

As best shown in FIGS. 5 and 6, the frame 24 may include parallel rails 26 extending generally along and beneath the platform 14 and to which the wheels may be mounted. The rails 26 may be generally thin, elongated extrusions of generally rectangular cross-section, or they may be tubular, or of any other suitable construction and configuration. The rails 26 may be interconnected by one or more base plates 28 extending between the rails. The base plates 28 may be fixed to the rails 26, such as by welding, mechanical fasteners or connectors, or in any other suitable manner. The rails 26 may include one or more slots or keyways 29 to facilitate secure attachment of other components to the rails. A platform support 30 may also be connected to the rails 26, generally along or adjacent to an upper surface of the rails. The platform support 30 may be formed in one piece, or multiple separate pieces, and may extend outwardly from the rails to provide an increased surface area of support for the platform 14, at least when the platform is in its first or lowered position. Corner braces 32 may be used to increase the surface area along which the platform support 30 is connected to the rails 26.

As best shown in FIGS. 1, 2, 10 and 11, the platform 14 may be defined at least in part by an outer support 34 and cross braces 36 extending across and within the outer support. The platform 14 may include one or more pallet retention features such as open spaces 38 between the outer support 34 and cross braces 36. The open spaces 38 may receive portions of the pallet 12 with which the cart 10 may be used providing shoulders or protrusions on the pallet 12 that are received adjacent to and engage a cross brace 36 or the outer support 34 to reduce or prevent relative sliding movement between the pallet 12 and platform 14. The outer support 34 may be defined by an extruded member bent into a desired configuration. As shown, the outer support 34 is generally U-shaped with each end adjacent to the rear of the frame 24. The outer support 34 may include inwardly extending flanges 42 between which the cross braces 36 are received for improved strength and rigidity of the platform 14. Of course, the platform 14 could be defined by any suitable structure providing an upper surface capable of supporting product loaded thereon, or a pallet upon which product is loaded.

As best shown in FIGS. 7, 8, 10 and 11, the platform 14 and frame 24 are interconnected by the lift assembly 16. The lift assembly 16 may include one or more actuators 44 which, in the implementation shown, may have a casing 46 carried by either the frame 24 or the platform 14 and a piston rod 48 operably connected to the other of the frame 24 and the platform 14. As shown, the casing 46 is connected to a base plate 28 of the frame 24 and the piston rod 48 is connected to platform 14, such as through a support block 50 connected to one or more cross braces 36. The piston rod 48 may be extended and retracted relative to the casing 46 under the force of hydraulic fluid provided within the casing to move the platform 14 relative to the frame 24. Of course, other actuators may be used in conjunction with or instead of the hydraulic cylinders, such as, pneumatic cylinders, servo motors, ball screw mechanisms, manual crank, or other actuators. And one or more than one actuator may be used, as desired.

The lift assembly 16 may also include a linkage 52 that connects to spaced apart locations along the platform 14 to provide controlled and balanced movement of the platform 14. The linkage 52 may include first and second link sets 54. Each link set 54 may include spaced apart pairs of upper and lower links 56, 58 connected together at pivots 60. The pairs of upper links 56 may be interconnected by a cross member 62 (FIG. 11), and the same may be true of the lower links 58. The upper links 56 may each be connected to the platform 14 at brackets 63 by pins 65, preferably spaced apart on opposed sides of the actuators 44 for increased stability of the lift assembly 16. The lower links 58 may each be connected to the frame 24, preferably spaced apart and connected to the opposite rails 26. The link sets 54 may be interconnected by a center link 64 that may be attached to the link sets 54 at the pivots 60 providing a generally fixed distance between the pivots 60 of the link sets 54 at all times. The center links may be interconnected by a cross member (not shown), which may be similar to cross member 62. As the lift assembly 16 moves the platform 14 from its lowered position, shown in FIG. 7, to its raised position, shown in FIGS. 8, 10 and 11, the linkage 52 moves between its folded and extended positions, respectively. Of course, other linkages may be used as desired (such as, for example, a scissor linkage).

Referring to FIGS. 1, 2 and 4, an operator control module 70 may be connected to the frame 24 adjacent a rear end of the frame. The control module 70 may be releasably connected to the frame/platform assembly such that different frames/platforms (different shapes and/or different sizes and/or different load capacities, etc) may be used with a given operator control module, or vice versa. Suitable keys, keyways and/or blocks 72 (FIGS. 1 and 10) may be used to interconnect the operator control module 70 to the frame 24, such as by use of threaded fasteners. The control module 70 may include an upright support 76 and one or more handles 78 for operator control of the cart. The upright 76 may include or be connected to a housing 80 in which a portion of the hydraulic lift assembly 16 may be contained. The housing 80 may include supports posts and front 82, side 84, rear 86, upper 88 and lower plates 90 defining an enclosure in which a drive member, such as a hydraulic drive 92 and related components may be contained. In one implementation, the rear wheels 22 may be carried by swivel brackets 93 attached to the lower plate 90.

In one implementation, as shown in FIG. 4 wherein the rear plate 86 has been removed, the hydraulic drive 92 includes an electrically driven pump assembly 94. Batteries 96 or other power source may also be contained in the housing 80, and the pump assembly 94 may include a manual override and manually actuated pump arm 98 to permit use of the lift assembly if the electrically driven pump 94 fails, or otherwise is not operational (e.g. insufficient power from the power source). The pump assembly 94 may include a reservoir or accumulator and may be connected to the actuators 44 by suitable hoses or other conduits. Pressure relief valves may be provided to prevent an over-pressure condition in the system which may damage a hose or other system component. The actuators 44 (e.g. hydraulic cylinders) may also be equipped with a flow-limiter to limit the speed at which the platform returns to its lowered position even if the hydraulic pressure quickly declines, such as due to a ruptured hose or leak. This prevents a free or "dead fall" of the platform 14 even if it is loaded with hundreds of pounds of product. Suitable hoses permit supply from and return to the pump of hydraulic fluid. Corresponding hoses may also be provided to permit supply to and return from the hydraulic cylinder of hydraulic fluid. When the control module is physically connected to the frame, the pump hoses are releasably connected to the cylinder hoses to complete a fluid flow circuit.

Figure 10:
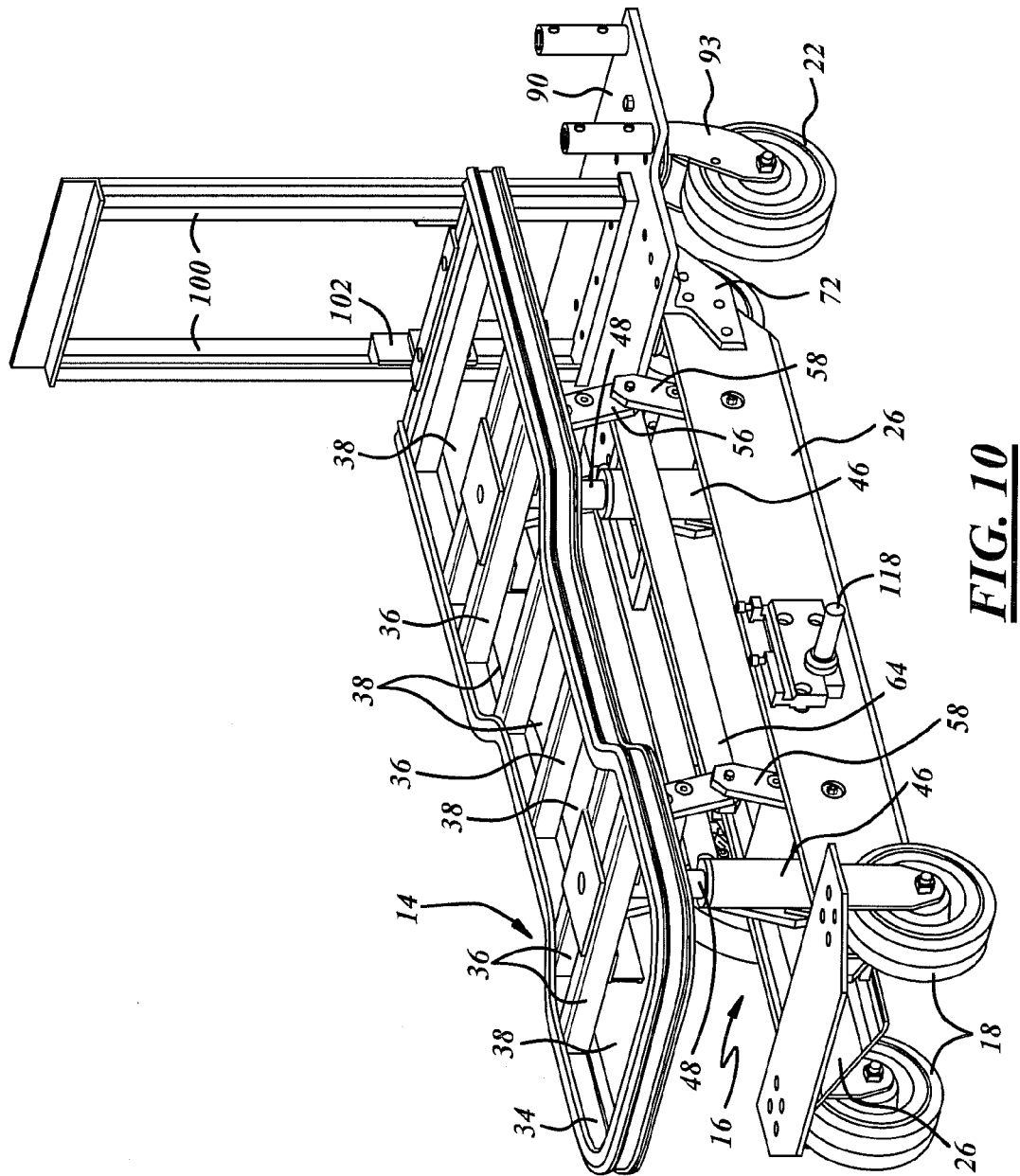
FIG. 10 is a perspective view of the cart of FIG. 1 with a portion of the frame, an operator control module and a wheel removed.
Figure 12:
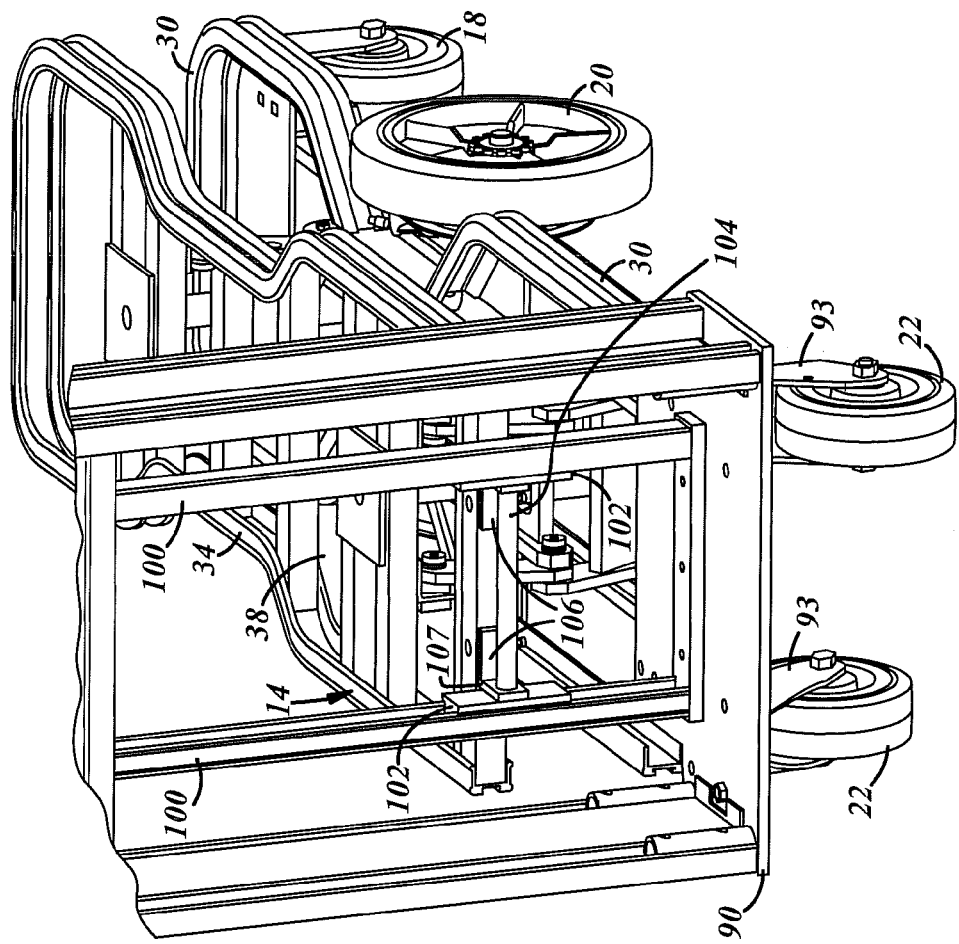
FIG. 12 is a fragmentary perspective view of a guide arrangement in the cart of FIG. 1.
Figure 11:
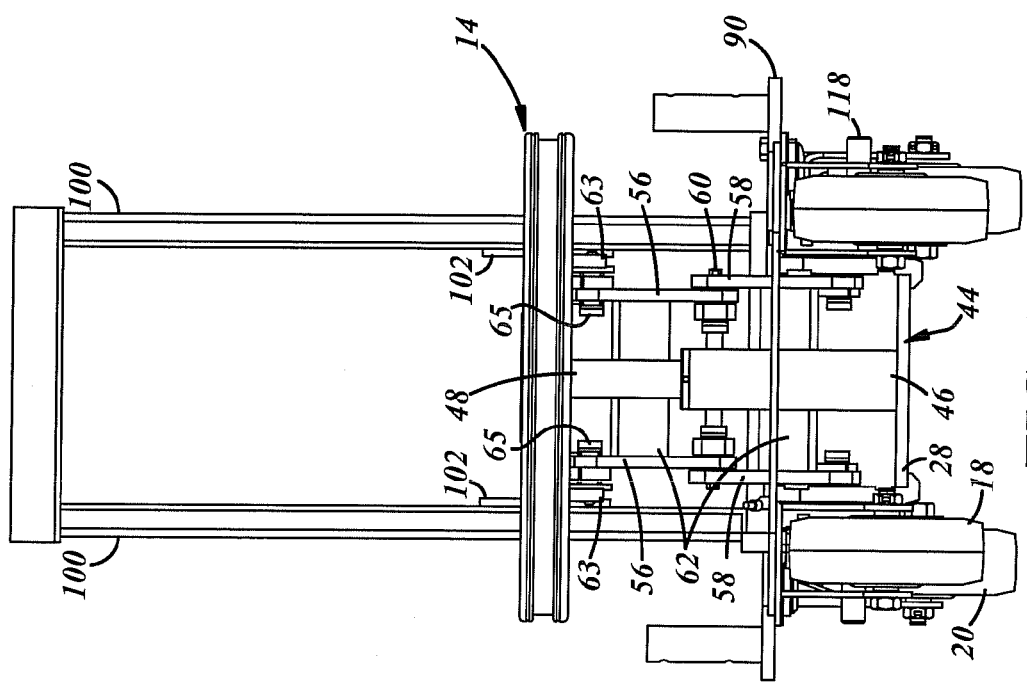
FIG. 11 is an end view of the cart of FIG. 10.

As best shown in FIGS. 10-12, the control module 70 may also include upright guide members or channels 100 extending from the lower plate 90. Guided members or blocks 102 carried by the platform 14 travel along the guide channels 100 to limit or prevent canting or inclination of the platform 14 relative to the ground as the platform is raised and lowered. The blocks 102 are rotatably received on a pivot pin 104 carried by the platform 14 such as by spaced apart brackets 106 extending from the platform. The pivot pin 104 may be fixed against rotation relative to the brackets 106 such that the platform does not pivot or rotate about the pivot pin. In one form, the pivot pin 104 may be fixed against rotation by roll pins that pass through the pivot pin and engage slots 107 (FIG. 12) in the brackets 106. The blocks 102 can rotate on the pivot pin 104, providing the degree of motion needed to prevent binding of the blocks 102 or platform 14 should the platform tilt front to back during its movement for some reason. Of course, other guiding arrangements may be used, and the guide channels 100 may also be carried by the frame 24 and not the control module 70.

Figure 13:
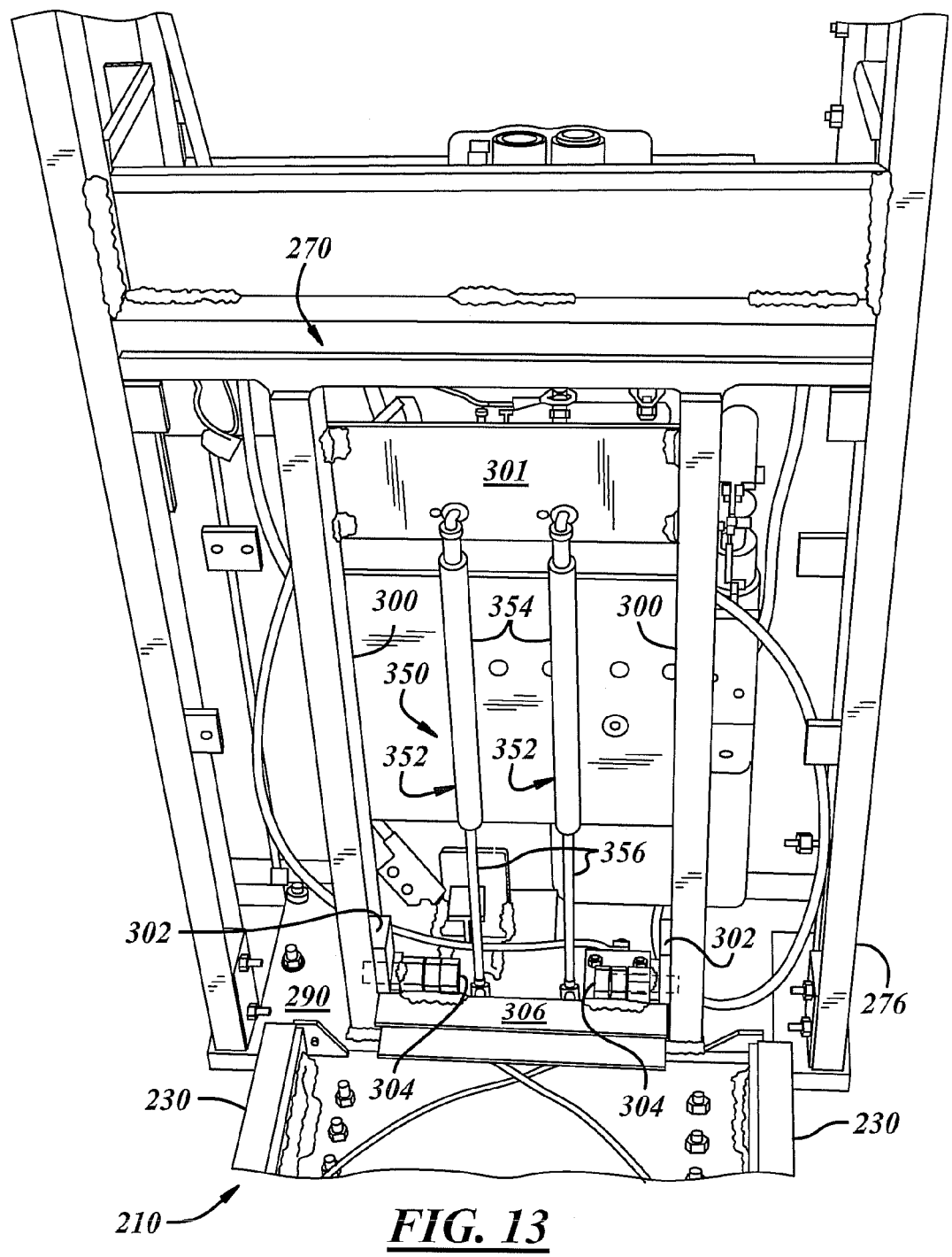
FIG. 13 is a perspective view of another implementation of the cart having a guide arrangement with a return-assist feature.
Figure 14:
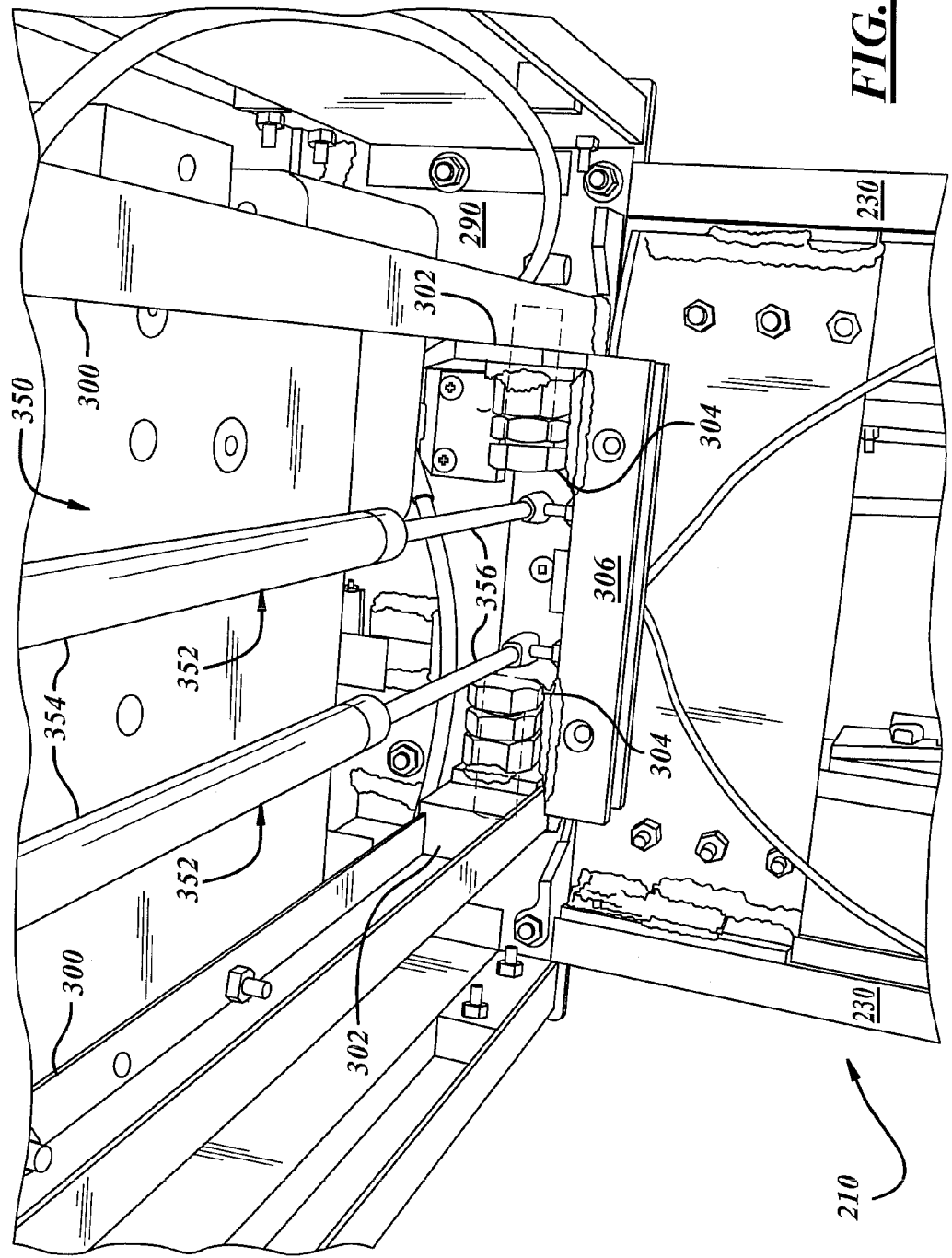
FIG. 14 is another perspective view the cart of FIG. 13.
Figure 15:
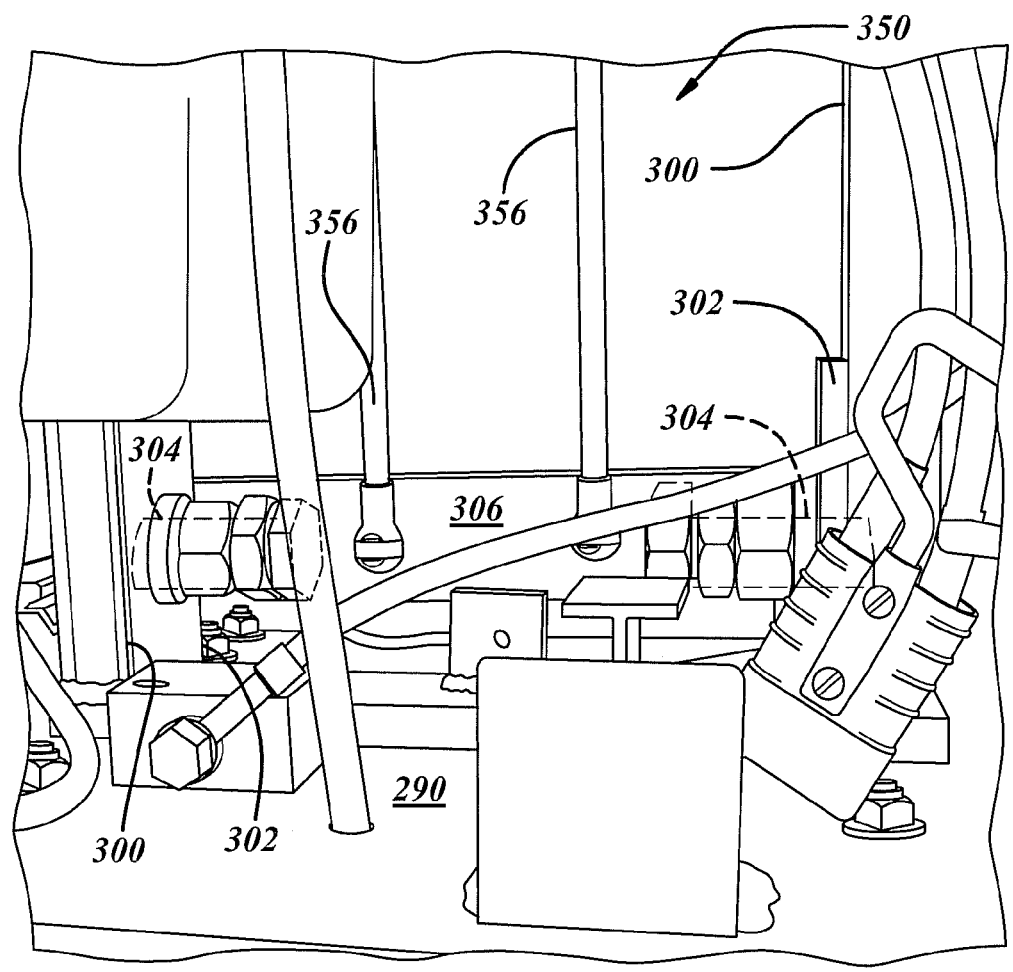
FIG. 15 is a rear end view the cart of FIG. 13.

Referring to FIGS. 13-15, there is shown another implementation of a cart 210 that may have a control module 270 with its front plate removed to show internal components. The cart 210 may have a pair of upright guide members 300, a pair of guided members 302 and a bracket 306, and may be substantially similar to the cart 10 of FIG. 12 having its upright guide members 100, guided members 102 and brackets 106. However, the bracket 306 may have opposed ends pivotally attached to a respective one of the guided members 302 by separate pivot pins 304. Further, the cart 210 may also have a return-assist feature 350 with one end (FIG. 15) that may be connected to the bracket 306, which may in turn be attached to the platform (not shown), and another end (FIG. 13) that may be mounted to a cross brace 301 that may extend between the upright guide members 300 or may instead be mounted to other portions of the cart 210.

The return-assist feature 350 in one implementation may be one or more conventional single-acting pneumatic cylinders 352. Each cylinder 352 may have a cylinder housing 354 that may be mounted to the cross brace 301, a piston (not shown) that may be movably carried within the housing 354 between opposed ends thereof, and a rod 356 that may extend from the piston and may be attached to the bracket 306. The housing 354 and the piston may define a chamber (not shown) that may contain air or other gases which may be compressed to a first pressure when the piston is moved toward one end of the housing 354 as the rod 356 is inserted into the housing 354, and a second pressure when the piston is moved toward the other end of the housing 354 as the rod 356 is extracted from the housing 354. The first and second pressure levels may be greater than atmospheric pressure so that the cylinders 352 may apply a downward force to the platform even when the cylinders are in their extended positions to yieldably bias the platform toward its lowered position.

Figure 16:
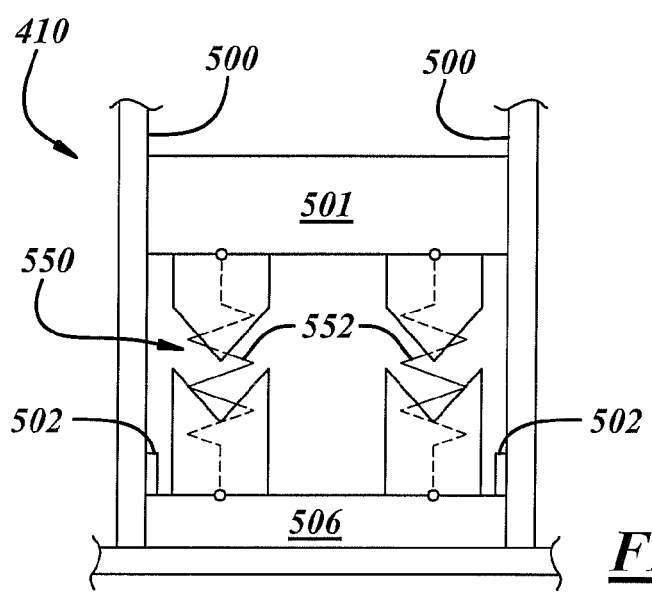
FIG. 16 is a schematic of still another implementation of the cart having a guide arrangement with a return-assist feature.

Referring to FIG. 16, there is shown another implementation of a cart 410 having a control module 470 with its front plate removed. The cart 410 may be similar to the cart 210 of FIG. 13. However, in this implementation, the return-assist feature 550 may be one or more helical springs 552 with one end associated with the bracket 506, which may extend from the platform, and another end mounted to the cross brace 501 or another portion of the cart 410, so that the springs may move the bracket 506 and platform downward. Each spring 552 may be partially contained within separate opposed top and bottom housing portions that may nest together as the platform is moved toward its raised position, or wholly contained within a telescopic housing. Of course, the return-assist feature may be other suitable passive biasing members, power-actuated lowering mechanisms or any suitable combination thereof. The return assist feature could be part of the main lifting assembly 16, such as a spring within the hydraulic cylinders 44, use of a double-acting cylinder for the cylinders 44, or use of some other double-acting device where the hydraulic cylinders 44 are not used (e.g. in pneumatic, ballscrew or other applications).

Figure 9:
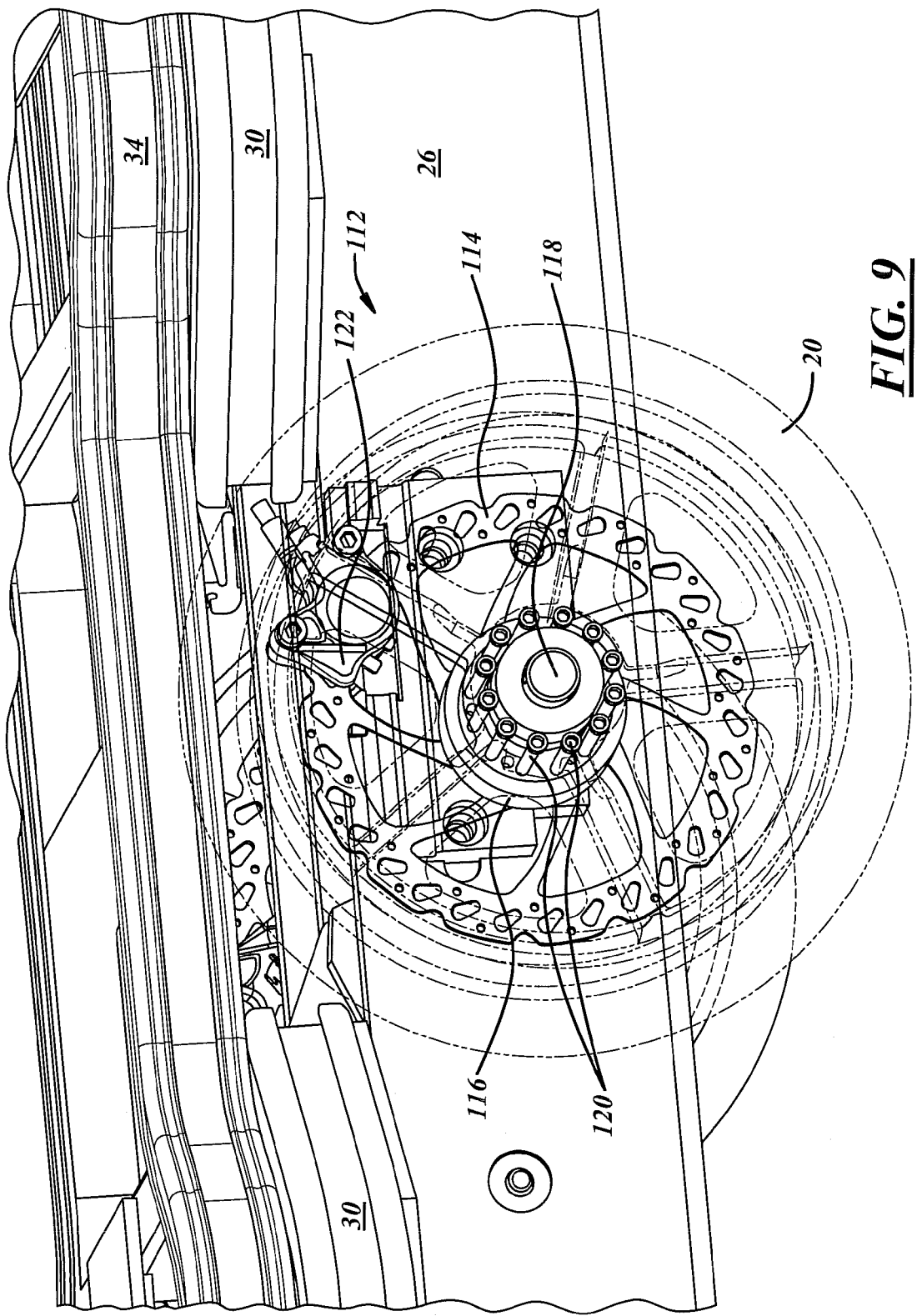
FIG. 9 is a fragmentary perspective view of an exemplary braking system for the cart, showing a wheel in phantom.

As shown in FIGS. 1 and 3, the operator control module 70 may also include a brake lever 110 adjacent to the handle(s) 78 and connected to one or more braking mechanisms. The brake mechanism may include a braking member carried by at least one wheel of the cart, and a driven member adapted to engage the brake member. In the implementation shown in FIG. 9, a disc brake mechanism 112 is associated with each middle wheel 20. The mechanism 112 may include a disc 114 (braking member) carried by a hub 116 that is fixed to the wheel 20 about an axle 118 extending between and upon which the middle wheels 20 are mounted. The hub 116 may be fixed to the wheel 20 by a plurality of fasteners 120 or by other suitable means. Brake calipers 122 (driven member) may be disposed adjacent to each disc 114 and may be moved into frictional engagement with the discs 114 by actuating the brake lever 110 which is connected to the calipers 122 by suitable cables in generally known manner. A single brake lever 110 may be operably associated with the calipers 122 for each wheel 20 through a distribution box that couples each caliper cable to a single cable actuated by the brake lever. Of course, other braking mechanisms may be used (such as drum brakes and brakes that engage a tire or other outer wheel surface), and they may be actuated by things other than a cable, such as a hydraulic actuated brake mechanism.

As shown in FIG. 3, a representative pallet 12 may include legs 130 that hold a product carrying surface 132 off the floor or ground. The cart 10 may be positioned with the platform 14 in its lowered position and disposed between the legs 130 and beneath the product carrying surface 132 of the pallet 12. To move the pallet 12 and product thereon, the platform 14 is raised by actuating the hydraulic pump to displace the piston rods 48 until the platform engages and lifts the pallet 12 off the ground. The hydraulic pump and the rods 48 may apply a force to the platform 14 that is sufficiently greater than the force that the return-assist feature 350 applies to the platform 14, so that the return-assist feature 350 does not significantly interfere with lifting of the pallet 14 and the product. With the platform 14 maintained in its raised position, the cart 10 can then be moved along the floor to locate the pallet/product as needed. The pressure in the hydraulic cylinders 44 can then be decreased (such as by opening a valve to permit fluid flow into the reservoir or accumulator) so that the weight of the pallet/product, in combination with the force applied by the return-assist feature, may retract the piston rods 48 into the casings 46 and quickly lower the pallet/product. Once the pallet/product has been lowered to the floor, the return-assist feature 350 may further retract the piston rods 48 into the casings 46 and lower the platform 14 away from the product carrying surface 132 of the pallet 12 so that the cart 10 may be removed and/or disengaged from the pallet 12. The return-assist feature also helps lower the platform 14 even when the platform is empty, and in general, can reduce the time to fully lower the platform so that it may be received beneath or moved away from the pallet or other product carrier.

While the forms of the invention herein disclosed constitute presently preferred embodiments, many others are possible. For example, while the cart shown and described above is manually movable along a floor or ground surface, the cart could be driven along the floor/ground by a prime mover (motor, engine, etc). It is not intended herein to mention all the possible alternatives, equivalent forms or ramifications of the invention. It is understood that the terms used herein are merely descriptive, rather than limiting, and that various changes may be made without departing from the spirit or scope of the invention.

The invention claimed is:

1. A cart, comprising:
a frame;
a plurality of wheels carried by the frame;
a pallet support platform movably carried by the frame;
a lift actuator carried at least in part by the frame and operably associated with the platform to move the platform up and down relative to the frame; said platform including one or more pallet retention features adapted to be engaged by a pallet disposed on the platform to limit relative sliding movement of the pallet;
a guide assembly including guide members carried by the frame and guided members carried by the platform for movement relative to the guide members, the guided members being rotatably movable relative to the guide members to reduce the tendency for the guided members to bind against the guide members during movement of the platform relative to the frame;
a linkage interconnecting the frame and the platform to distribute the force provided on the platform by the lift actuator to at least two spaced apart locations on the platform; and
the linkage further includes first and second link sets with each link set having upper links connected to the platform and lower links connected to the frame, the upper links and lower links being connected together at a pivot, and the linkage also includes a center link interconnecting the first and second link sets.

2. The cart of claim 1 wherein the guided members are carried on a pivot that is fixed against rotation relative to the platform.

3. The cart of claim 1 which also includes a return assist feature operably associated with the platform to lower the platform.

4. The cart of claim 3 wherein the return assist feature produces a force on the platform opposing the force on the platform provided by the lift actuator, and the force produced by the return assist feature increases as the platform is driven to a raised position by the lift actuator to facilitate returning the platform to a lowered position when it is not driven by the lift actuator.

5. The cart of claim 4 wherein the return assist feature includes at least one pneumatic cylinder, hydraulic cylinder or spring.

6. The cart of claim 1 which also includes said lift actuator being electrically driven.

7. The cart of claim 6 wherein the electrically driven lift actuator is powered by a battery carried by the frame.

8. The cart of claim 7 wherein the lift actuator may be manually operated to permit use without electrical power.

9. The cart of claim 1 in which said lift actuator is a hydraulic actuator, said cart including a flow limiter that limits the flow rate of hydraulic fluid out of the hydraulic actuator to limit the speed at which the platform moves toward its lowered position.

10. The cart of claim 1 which also includes an operator control module releasably coupled to the frame to permit the control module to be used with different frames and platforms.

11. The cart of claim 10 wherein said lift actuator is a hydraulic actuator, and the control module includes an upright and one or more handles, a hydraulic pump, a battery to electrically drive the pump, and conduits permitting supply from and return to the pump of hydraulic fluid, and which also includes one or more conduits permitting supply to and return from the hydraulic actuator of hydraulic fluid and when the control module is connected to the frame, the pump conduits are releasably connected to the actuator conduits.

12. The cart of claim 1 which also includes a brake mechanism having a brake member carried by at least one wheel, and a driven member adapted to engage the brake member.

13. The cart of claim 12 which also includes a hub upon which a wheel is carried, and wherein the brake member includes a disc fixed to the hub and the actuated member includes brake calipers disposed adjacent to the disc to selectively frictionally engage the disc when actuated.

14. The cart of claim 1 which also includes
a lift assembly carried at least in part by the frame and operably associated with the platform to move the platform relative to the frame; and
an operator control module releasably coupled to the frame and including one or more handles and a portion of the lift assembly.

15. The cart of claim 14 wherein the lift assembly includes a drive member carried by the operator control module and an actuator driven by the drive member and coupled to the frame and platform to move the platform relative to the frame.

16. The cart of claim 15 wherein the drive member is electrically driven and the operator control module also carries a battery connected to the drive member.

17. The cart of claim 15 wherein the drive member is a hydraulic pump and the operator control module also includes suitable conduits connected to the hydraulic pump and adapted to be releasably coupled to conduits associated with the actuator when the operator control module is coupled to the frame.

18. The cart of claim 1, combined with a pallet having downwardly depending side legs having an inside width therebetween, said frame and said platform having approximately the same width from side to side, said width being slightly narrower than said inside width between said pallet legs.

19. The cart of claim 18 comprising:
said frame including a platform support having sides defining the width of said frame;
said sides deviating inwardly for a portion of the distance along the length of said sides;
said plurality of wheels including a pair of forward wheels, a pair of middle wheels, and a pair of rear swivel mounted wheels carried by the frame;
said pair of middle wheels being larger in diameter than said pairs of front and rear wheels, and being located in said inward deviations in said platform sides, whereby said middle wheels are located generally within the width of said frame in order to keep said cart compact from side to side;
said front and rear wheels being smaller in diameter than said middle wheels, whereby they are located generally below said frame, between said platform sides;
said front and rear wheels also being positioned such that said front wheels are elevated above the ground when said middle and rear wheels engage the ground, allowing the cart to be pivoted on said middle wheels and said rear swivel wheels for convenient mobility.

20. The cart of claim 19 comprising:
said frame being formed of side support members and platform support members secured thereto and extending outwardly therefrom to define the width of said frame, and to provide an open framework platform support;
said platform being an open framework platform, defined by side frame members joined by cross members, leaving openings in said platform;
said platform openings providing said one or more pallet retention features adapted to be engaged by a pallet disposed on the platform to limit relative sliding movement of the pallet.

21. The cart of claim 1 comprising:
said frame including a platform support having sides defining the width of said frame;
said sides deviating inwardly for a portion of the distance along the length of said sides;
said plurality of wheels including a pair of forward wheels, a pair of middle wheels, and a pair of rear swivel mounted wheels carried by the frame;
said pair of middle wheels being larger in diameter than said pairs of front and rear wheels, and being located in said inward deviations in said platform sides, whereby said middle wheels are located generally within the width of said frame in order to keep said cart compact from side to side;
said front and rear wheels being smaller in diameter than said middle wheels, whereby they are located generally below said frame, between said platform sides;
said front and rear wheels also being positioned such that said front wheels are elevated above the ground when said middle and rear wheels engage the ground, allowing the cart to be pivoted on said middle wheels and said rear swivel wheels for convenient mobility.

22. A cart, comprising:
a frame formed of side support members and platform support members secured thereto and extending outwardly therefrom to provide frame sides which define the width of said frame from side to side, and to provide an open framework platform support;

said platform support members deviating inwardly for a portion of the distance along the length of said frame sides;

a pair of forward wheels, a pair of middle wheels, and a pair of rear swivel mounted wheels carried by said frame;

said pair of middle wheels being larger in diameter than said pairs of front and rear wheels, and being located in said inward deviations in said platform sides, whereby said middle wheels are located generally within the width of said frame in order to keep said cart compact from side to side;

said front and rear wheels being smaller in diameter than said middle wheels, whereby they are located generally below said frame, between said platform sides;

said front and rear wheels also being positioned such that said front wheels are elevated above the ground when said middle and rear wheels engage the ground, allowing the cart to be pivoted on said middle wheels and said rear swivel wheels for convenient mobility;

an open framework platform movably carried by the frame;

said open framework platform being defined by side frame members joined by cross members, leaving openings in said platform;

a lift actuator carried at least in part by the frame and operably associated with the platform to move the platform up and down relative to the frame.

23. The cart of claim 22 which also includes a guide assembly including guide members carried by the frame and guided members carried by the platform for movement relative to the guide members, the guided members being rotatably movable relative to the guide members to reduce the tendency for the guided members to bind against the guide members during movement of the platform relative to the frame.

24. The cart of claim 23 wherein a linkage that interconnects the frame and the platform to distribute the force provided on the platform by the lift actuator to at least two spaced apart locations on the platform.

25. The cart of claim 24 wherein the linkage includes first and second link sets with each link set having upper links connected to the platform and lower links connected to the frame, the upper links and lower links being connected together at a pivot, and the linkage also includes a center link interconnecting the first and second link sets.

26. A cart, comprising:
a frame formed of side support members and platform support members secured thereto and extending outwardly therefrom to define the width of said frame, and to provide an open framework platform support;
a plurality of wheels carried by said frame;
an open framework platform movably carried by the frame;
said open framework platform being defined by side frame members joined by cross members, leaving openings in said platform;
a lift actuator carried at least in part by the frame and operably associated with the platform to move the platform up and down relative to the frame;

said platform openings providing one or more pallet retention features adapted to be engaged by a pallet disposed on the platform to limit relative sliding movement of the pallet;

a guide assembly including guide members carried by the frame and guided members carried by the platform for movement relative to the guide members, the guided members being rotatably movable relative to the guide members to reduce the tendency for the guided members to bind against the guide members during movement of the platform relative to the frame;

a linkage interconnecting the frame and the platform to distribute the force provided on the platform by the lift actuator to at least two spaced apart locations on the platform; and the linkage includes first and second link sets with each link set having upper links connected to the platform and lower links connected to the frame, the upper links and lower links being connected together at a pivot, and the linkage also includes a center link interconnecting the first and second link sets.

27. A cart and pallet combination, said pallet having downwardly depending side legs having an inside width therebetween, said cart comprising:
a frame;
a plurality of wheels carried by the frame;
an open framework platform movably carried by the frame;
said open framework platform being defined by side frame members joined by cross members, leaving openings in said platform;
a lift assembly carried at least in part by said frame and operably associated with said platform to move the platform relative to the frame, the lift assembly including at least one actuator movable to move the platform upwardly and downwardly relative to said frame;
said frame and said platform having approximately the same width from side to side, said width being slightly narrower than said inside width between said pallet legs;
a guide assembly including guide members carried by the frame and guided members carried by the platform for movement relative to the guide members, the guided members being rotatably movable relative to the guide members to reduce the tendency for the guided members to bind against the guide members during movement of the platform relative to the frame;
a linkage interconnected to the frame and the platform to distribute the force provided on the platform by the lift actuator to at least two spaced apart locations on the platform; and
the linkage includes first and second link sets with each link set having upper links connected to the platform and lower links connected to the frame, the upper links and lower links being connected together at a pivot, and linkage also includes a center link interconnecting the first and second link sets.

* * * * *